United States Patent
Kim et al.

(10) Patent No.: US 12,381,479 B2
(45) Date of Patent: Aug. 5, 2025

(54) POWER TRANSFORMING APPARATUS AND AIR CONDITIONER INCLUDING THE SAME

(71) Applicant: LG Electronics Inc., Seoul (KR)

(72) Inventors: Sanghyeon Kim, Seoul (KR); Phillsik Gong, Seoul (KR); Jeongeon Oh, Seoul (KR); Songhee Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 17/952,814

(22) Filed: Sep. 26, 2022

(65) Prior Publication Data

US 2023/0155485 A1 May 18, 2023

(30) Foreign Application Priority Data

Nov. 16, 2021 (KR) .................. 10-2021-0157865

(51) Int. Cl.
*H02M 5/458* (2006.01)
*F24F 11/88* (2018.01)
(Continued)

(52) U.S. Cl.
CPC ........... *H02M 1/4225* (2013.01); *F24F 11/88* (2018.01); *H02M 1/0009* (2021.05); *H02P 27/08* (2013.01); *H02M 7/06* (2013.01)

(58) Field of Classification Search
CPC ...... F24F 11/88; H02M 5/458; H02M 3/1586; H02M 1/4225; H02M 1/0009; H02M 7/06; H02P 27/08; Y02B 70/10
(Continued)

(56) References Cited

U.S. PATENT DOCUMENTS 8,031,497 B2 * 10/2011 Chou .................. H02J 7/35
                                                  323/237
8,098,505 B1    1/2012 Choi
(Continued)

FOREIGN PATENT DOCUMENTS

KR     20150162239       11/2015
KR     10-2019-0052353 A  5/2019
KR     102043216        11/2019

OTHER PUBLICATIONS

Cheng et al., 19th International Conference on Electrical Machines and Systems (ICEMS) (Year: 2016).*
(Continued)

*Primary Examiner* — Gabriel Agared
(74) *Attorney, Agent, or Firm* — Fish & Richardson P.C.

(57) ABSTRACT

The present disclosure discloses a power transforming apparatus capable of reducing a stress of a converter switch during a PFC operation, an operation method thereof, and an air conditioner including the same. To this end, the power transforming apparatus according to the present disclosure may determine the number of converters for performing the PFC operation based on a magnitude of input power and a speed of the motor. Furthermore, the PFC operation may be performed using only one converter when determining a low-load in order to improve efficiency. In addition, a target converter channel may be selected using a random function or determined to be changed using a previous operation history without specifying a target converter channel in advance at an initial stage of the PFC operation so as not to add a stress to any one converter switch.

16 Claims, 8 Drawing Sheets

(51) Int. Cl.
*H02M 1/00* (2006.01)
*H02M 1/42* (2007.01)
*H02P 27/08* (2006.01)
*H02M 7/06* (2006.01)

(58) Field of Classification Search
USPC .......................................................... 318/89
See application file for complete search history.

(56) References Cited

U.S. PATENT DOCUMENTS

| | | | | |
|---|---|---|---|---|
| 2010/0118573 | A1* | 5/2010 | Saint-Pierre | H02M 1/4225 |
| | | | | 363/126 |
| 2011/0080151 | A1 | 4/2011 | Rahardjo et al. | |
| 2015/0207400 | A1* | 7/2015 | Shenoy | H02M 3/1584 |
| | | | | 323/213 |
| 2016/0190912 | A1* | 6/2016 | Lim | H02M 1/4225 |
| | | | | 363/84 |
| 2016/0248365 | A1* | 8/2016 | Ishizeki | H02M 1/4225 |
| 2018/0069424 | A1* | 3/2018 | Yang | H02J 7/00 |
| 2018/0069471 | A1* | 3/2018 | Leisten | H02M 1/4225 |
| 2018/0131263 | A1 | 5/2018 | Sreenivas | |
| 2019/0229611 | A1* | 7/2019 | Chizuwa | H02M 1/32 |
| 2022/0345067 | A1* | 10/2022 | Kim | F24F 11/88 |

OTHER PUBLICATIONS

Cheng et al., "A Design of Single Phase Inverter with Three-Channel Interleaved PFC Module," 2016 19th International Conference on Electrical Machines and Systems (ICEMS), Nov. 13, 2016, 5 pages.

Extended European Search Report in European Appln No. 22195486.0, dated Mar. 23, 2023, 10 pages.

Grote et al., "Semi-Digital Interleaved PFC Control with Optimized Light Load Efficiency," 2009 Twenty-Fourth Annual IEEE Applied Power Electronics Conference and Exposition, Feb. 15, 2009, 6 pages.

Su et al., "A Novel Phase-Shedding Control Scheme for Improved Light Load Efficiency of Multiphase Interleaved DC-DC Converters, " IEEE Transactions on Power Electronics, Oct. 1, 2013, 28(10):4742-52.

Ahn et al., "A multiphase Buck Converter with a Rotating Phase-Shedding Scheme for Efficient Light-Load Control," IEEE Journal of solid-state circuits, Nov. 2014, 49(11):2673-83.

Office Action in European Appln. No. 22195486.0, mailed on Feb. 20, 2024, 5 pages.

Notice of Allowance in Korean Appln. No. 10-2021-0157865, mailed on Aug. 26, 2024, 10 pages (with English translation).

* cited by examiner

|      | ENABLE  | DISABLE |
|------|---------|---------|
| CH 1 | 900W    | 300W    |
| CH 2 | 1,500W  | 1,300W  |
| CH 3 | 2,500W  | 2,300W  |

(a)

(b)

(a)

(b)

POWER TRANSFORMING APPARATUS AND AIR CONDITIONER INCLUDING THE SAME

CROSS-REFERENCE TO RELATED APPLICATIONS

Pursuant to 35 U.S.C. § 119(a), this application claims the benefit of an earlier filing date of and the right of priority to Korean Patent Application No. 10-2021-0157865, filed on Nov. 16, 2021, the contents of which are incorporated by reference herein in its entirety.

TECHNICAL FIELD

The present disclosure relates to a power transforming apparatus and an air conditioner including the same, and more particularly, to a power transforming apparatus capable of reducing a stress of a converter switch during a PFC operation, and an air conditioner including the same.

BACKGROUND

In general, a compressor of an air conditioner uses a motor as a driving source. A motor generally has a structure in which a rotating shaft located inside a stator is supported by a bearing in physical contact therewith. In recent years, in accordance with the need to develop a motor rotating at a high speed, a motor for high-speed rotation in which a rotating shaft is supported with no physical contact by a magnetic bearing has been developed. In either case, the motor is supplied with power through a power transforming apparatus.

It is generally known that such a power transforming apparatus mainly includes a rectifier unit, a power factor improving unit, and an inverter type power transforming unit. Specifically, an AC commercial voltage output from a commercial power source is rectified by the rectifier unit. A voltage rectified by the rectifier unit is stored in a capacitor, and then supplied to an inverter to generate AC power for driving the motor. Furthermore, a DC-DC converter for improving power factor may be provided between the rectifier unit and the inverter.

Meanwhile, components that account for the largest fraction of the causes of failure in the power transforming apparatus are known as capacitors and power semiconductor devices (IGBTs, MOSFETs, etc.). Among them, the power semiconductor device performs power conversion while repeatedly performing on/off operations, and at this time, PFC loss occurs, and the loss is dissipated as heat. For example, as the number of times a temperature change of a switch rapidly changes according to the on/off operation of the converter (product) to which the power semiconductor device is applied increases, the power semiconductor device is subjected to a stress, which becomes a main cause of shortening the life of the product.

Accordingly, Korean Patent Laid-Open No. 10-2015-0162239 (hereinafter, 'Prior Document 1') relates to an interleaved PFC control method and system, and discloses a method of setting output voltage duty ratios to be the same by using two boost converters. Specifically, a method of controlling current balancing of two converters to reduce a current PFC output voltage ripple is disclosed. However, according to Prior Document 1, an output voltage of a slave converter is determined by an output voltage of a master converter. In this case, since an individual phase control of the converter is not carried out, unnecessary switching occurs, and maximum efficiency cannot be guaranteed for each load. Accordingly, the unnecessary switching of the power semiconductor device occurs to increase the possibility of shortening the life of the power semiconductor device.

Furthermore, U.S. Pat. No. 8,098,505 ('Prior Document 2') relates to controlling a gate IC by driving two interleaved PFCs, and a gate signal is generated to turn on/off the power semiconductor in a drive IC according to a specific condition. In this case, the gate signal always operates one phase first, which adds a stress to the power semiconductor device that has started an operation first, and this also causes a reduction in the life of the power semiconductor.

In addition, when a stress is added to a specific power semiconductor device, a performance imbalance occurs among a plurality of power semiconductor devices, thereby causing a problem in that heat generation of a reactor connected to each power semiconductor increases.

SUMMARY

Accordingly, the present disclosure provides a power transforming apparatus capable of reducing a stress of a converter switch during a PFC operation, an operation method thereof, and an air conditioner including the same.

Furthermore, the present disclosure provides a power transforming apparatus capable of reducing unnecessary switching by specifying the number of converter channels for performing a PFC operation based on a magnitude of input power, an operating method thereof, and an air conditioner including the same.

Furthermore, the present disclosure provides a power transforming apparatus capable of applying an algorithm to differently control the phase of a converter switch according to a load capacity so as to improve efficiency at a low load and effectively reduce the number of switching for each converter, an operating method thereof, and an air conditioner including the same.

Furthermore, the present disclosure provides a power transforming apparatus capable of dispersing a switch stress of each converter by arbitrarily setting a switching time and a PFC operation sequence of a plurality of converters without specifying them, an operating method thereof, and an air conditioner including the same.

Furthermore, the present disclosure provides a power transforming apparatus capable of performing more stable phase control in consideration of a load fluctuation by applying a hysteresis condition to perform a switching operation in determining the number of converters for performing a PFC operation, an operating method thereof, and an air conditioner including the same.

In order to solve the above problems, a power transforming apparatus according to an embodiment of the present disclosure, which is a power transforming apparatus for driving an inverter to drive a motor, may determine the number of converters for performing a PFC operation based on a magnitude of input power and a speed of the motor.

Furthermore, the power transforming apparatus according to the present disclosure may perform a PFC operation by using only one converter when determining a low-load in order to improve efficiency at the low-load.

In addition, the power transforming apparatus according to the present disclosure may determine a target converter channel using a random function or using a previous operation history without specifying the target converter channel in advance at an initial stage of the PFC operation so as not to add a stress to a switch element of any one converter.

Moreover, the power transforming apparatus according to the present disclosure may differently set enable and disable switching boundary points that match the number of target converter channels (to enable hysteresis switching) based on a magnitude of input power and a speed of a motor for efficient phase control.

In one embodiment, a power transforming apparatus according to the present disclosure may include a rectifier unit that rectifies an input AC voltage, a power factor improving unit that performs a PFC operation for improving power factor on a rectified voltage output from the rectifier unit, the power factor improving unit including a plurality of converter channels, a DC link capacitor that stores an output voltage of the power factor improving unit, a current sensing unit located between the rectifier unit and the power factor improving unit, and a controller. Here, the plurality of converter channels may be three converter channels.

Furthermore, the controller may determine the number of converter channels for performing a PFC operation among the plurality of converter channels based on input power and a speed of the motor calculated using an input current sensed by the current sensing unit while the inverter is driven.

Furthermore, when determining the number of converter channels for performing a PFC operation, the controller may determine target converter channels for performing the PFC operation according to whether at least one converter channel is in operation. When there is no converter channel in operation, the target converter channel for initially performing the PFC operation is not limited to a specific converter channel.

Furthermore, the controller may differently determine a switching time during the operation of the target converter channel to control the power factor improving unit. Here, only one converter channel may perform the PFC operation according to a magnitude of input power.

Furthermore, depending on the magnitude of the input power, when all converter channels perform the PFC operation, a switching operation sequence may be changed each time.

In one embodiment, the controller may determine a switching driving sequence of target converter channels for the PFC operation by using a predetermined function when there is no at least one converter channel in operation when determining the number of converter channels.

In one embodiment, the predetermined function may be a random function.

In one embodiment, the controller may store a switching history of a converter channel that has previously performed the PFC operation, and exclude a switching time of the converter channel that has been operated immediately before from an initial driving sequence based on the stored switching history when the predetermined function is applied.

In one embodiment, the power factor improving unit may include a first converter channel, a second converter channel, and a third converter channel, and the current sensing unit may sense the input current through a shunt resistor connected in series to each of the first to third converter channels.

In one embodiment, the driving of the motor may be determined to be any one of a low-load operation section, a medium-load operation section, and a high-load operation section based on a magnitude of the sensed input current and the speed of the motor, wherein the controller differently determines the number of target converter channels for performing a PFC operation for each load operation section.

In one embodiment, the controller may determine an arbitrarily selected one converter channel among the first to third converter channels as a target converter channel in the low-load operation section to control the power factor improving unit so as to perform a PFC operation.

In one embodiment, when determining the number of target converter channels based on a change of the input power, the controller may differently apply each enable switching time and each disable switching time of the first to third converter channels corresponding to a magnitude of the input power.

In one embodiment, a value of first input power corresponding to a switching time of a target converter channel determined when a load operation section is changed as the sensed input current decreases may be smaller than that of second input power corresponding to a switching time of a target converter channel determined when a load operation section is changed as the sensed input current increases.

In one embodiment, when only two of the first to third converter channels are enabled as the sensed input current decreases, the controller may determine a switching time such that the phases of the two converter channels enabled during the PFC operation become 180 degrees so as to control the power factor improving unit.

In one embodiment, when all of the first to third converter channels are enabled as the sensed input current increases, the controller may determine a switching time such that the phases of the first to third converter channels during the PFC operation become 120 degrees so as to control the power factor improving unit.

An operating method of a power transforming apparatus according to an embodiment of the present disclosure, as an operating method for driving an inverter to drive a motor, the operating method may include detecting a magnitude of input power and a speed of the motor when the inverter is driven, and determining the number of converter channels for performing a PFC operation among a plurality of converter channels based on the detected magnitude of input power and the speed of the motor.

Furthermore, the operating method may determine target converter channels for performing the PFC operation according to whether at least one converter channel is in operation when determining the number of converter channels for the PFC operation. When there is no converter channel in operation, the target converter channel for initially performing the PFC operation is not limited to a specific converter channel. When there is a converter channel in operation and the number of target converter channels for performing the PFC operation increases, a switching operation sequence may be changed each time.

Furthermore, depending on the magnitude of the input power, when all converter channels perform the PFC operation, the switching operation sequence may also be changed each time.

In addition, when there is an active converter channel and the number of target converter channels for performing the PFC operation decreases, a hysteresis condition may be applied to perform a stable switching operation. For example, a magnitude of the input power when the converter channel is enabled may be different from that of the input power when the converter channel in operation is disabled.

In one embodiment, the operating method may further include determining target converter channels for the PFC operation and a switching driving sequence thereof using a random function when there is no at least one converter channel in operation.

In one embodiment, when determining the number of target converter channels based on a change of the detected input power, the operating method may differently apply each enable switching time and each disable switching time of the first to third converter channels corresponding to a magnitude of the input power.

In one embodiment, a value of first input power corresponding to a switching time of a target converter channel determined when a load operation section is changed as the detected input current decreases than before may be set to be smaller than that of second input power corresponding to a switching time of a target converter channel determined when a load operation section is changed as the detected input current increases than before.

A computer-readable recording medium according to an embodiment of the present disclosure may include a program executed on a computer in which the above-described method of operating the power transforming apparatus is performed by at least one processor.

An air conditioner according to an embodiment of the present disclosure may be implemented to include a compressor to which the above-described power transforming apparatus is applied.

A power transforming apparatus according to the present disclosure, and an effect of an air conditioner including the same will be described as follows.

The present disclosure may determine converter channels for initially performing a PFC operation, randomly or by reflecting an operation history, in relation to driving a motor, without specifying them in advance, thereby preventing the life of a specific converter switch from being shortened due to a stress added thereto.

Furthermore, a PFC operation may be performed with only one arbitrary converter at a low-load, thereby improving low-load efficiency while excluding unnecessary converter switch driving.

In addition, it is possible to provide a converter control algorithm that performs a PFC operation at the maximum efficiency while excluding unnecessary switching based on the speed of the motor and the magnitude of the input power.

Moreover, in determining the 'number' of target converter channels for a PFC operation, hysteresis switching may be performed in consideration of a fluctuation of a load as well as the speed of the motor and the magnitude of the input power, thereby performing more stable PFC switching control.

DETAILED DESCRIPTION

Figure 1:
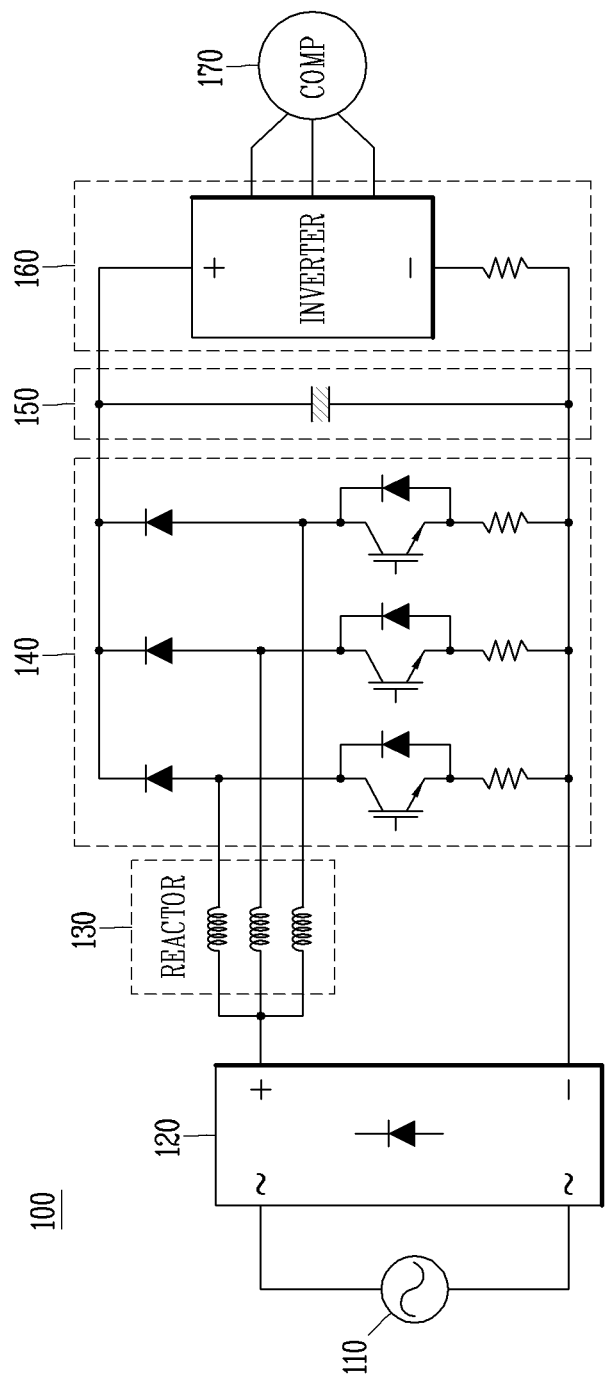
FIG. 1 is a diagram showing a circuit configuration of a power transforming apparatus according to the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, etc. can be used to describe various elements, but the elements should not be limited by those terms. The terms are used merely for the purpose of distinguishing an element from the other elements.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular expression includes a plural expression unless the context clearly dictates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Furthermore, the "power transforming apparatus" disclosed herein may be applicable to a compressor driven by driving an inverter to drive a motor, and by using a rotational force of the motor, and an air conditioner including such a compressor.

Besides, a "first converter channel", a "second converter channel", and a "third converter channel" disclosed herein do not denote a specific converter matching an actual product or a specific sequence. For example, when operating with two converters, it may operate using the first and second converter channels, operate using the second and third converter channels, or operate using the first and third converter channels.

In addition, a "controller" disclosed herein, which is a generic concept denoting a configuration that controls the operation of each component of the power transforming apparatus, and if necessary, may refer to a 'microcomputer', a 'processor', a 'converter controller', or an 'inverter controller'.

Furthermore, a "PFC operation" disclosed herein denotes that a converter performs a switching operation for power factor improvement and efficiency improvement. Accordingly, the 'converter' disclosed herein may be referred to as denoting a "PFC converter".

FIG. 1 is a diagram showing a circuit configuration of a power transforming apparatus according to the present disclosure.

The power transforming apparatus of FIG. 1 may be used to drive a compressor. During a load operation of the compressor, a switching operation of a booster converter is required by applying a PFC control algorithm to improve power factor, and the present disclosure will be mainly described on the operation of the booster converter associated with efficient PFC control. In addition, in the present disclosure, an efficient PFC control method is proposed in consideration of an entire load range such as a no-load, a low-load, medium-load, and a high-load.

In FIG. 1, the power transforming apparatus 100 according to the present disclosure receives AC power from a commercial power source, that is, a power supply unit 110, converts power, and then supplies the converted power to a motor 170 connected thereto.

To this end, the power transforming apparatus 100 may include a rectifier unit 120 that rectifies the AC power output from the power supply unit 110, reactors 130 that smooth the rectified power, a plurality of converters 140 having power semiconductor devices to perform a PFC operation for improving power factor, a DC link capacitor 150, and an inverter 160, and may be connected to the motor 170 driven by a current supplied from the inverter 160.

Here, the motor 170 has been described on the premise of a motor for a compressor, but is not limited thereto, and may also be applicable to motors of various products driven using a frequency-variable AC voltage, for example, motors of refrigerators, washers, automobiles, cleaners, and the like.

The converter 140 may be implemented as a DC-DC converter or a boost converter, and may include a plurality of converter channels (or converter phases/converter switches). For example, the converter 140 may include three converter channels, and each converter channel may be connected in series with at least one sensing resistor, respectively. In FIG. 1, three converter channels are connected to one DC link capacitor 150, and each converter channel of the converter 140 is connected in parallel with the DC link capacitor 150, respectively. That is, the DC link capacitor 150 has a structure connected in parallel with three power semiconductor devices, respectively.

Furthermore, although not shown, a current sensing unit (not shown) for detecting an input current, for example, a CT, may be included between the reactor 130 that smooths the rectified AC power and the converter 140. In this case, the input current of the power transforming apparatus 100 may be detected using the current sensing unit.

Each converter channel of the converter 140 may be implemented by including an inductor, a switching device, and a diode, the inductor may be located at a side of the rectifier unit 120 at a front end of the converter 140, the switching device may be connected to the reactor 130, and the diode may be located between the switching device and the DC link capacitor 150 or the sensing resistor. Such a switching device is switched by a pulse width modulation (PWM) signal output from a converter controller or a microcomputer to perform a PFC operation.

The DC link capacitor 150 is connected in parallel to a plurality of converter channels of the converter 140, respectively, and charges a voltage output from the converter 140. Although only one DC link capacitor 150 is shown in FIG. 1, two or more DC link capacitors may be provided if necessary. The inverter unit 160 connected to the DC link capacitor 150 converts the DC power of the DC link capacitor 150 into AC power through a plurality of inverter switching devices, and supplies the AC power to the motor 170.

Meanwhile, each converter channel of the converter 140 is connected in series to a sense resistor, and a shunt resistor (shunt) may be used for such a sensing resistor. In this case, the shunt resistor is connected in series with the switching device of each converter channel, respectively, as shown in FIG. 1. In one embodiment, the input power may be detected through the shunt resistor.

Whether or not to perform a PFC operation of each converter channel in the converter 140 is determined based on the magnitude of the input power and the speed of the motor 170. More specifically, the power transforming apparatus 100 may determine may determine the number of target converter channels for performing the PFC operation based on the magnitude of the input power and the speed of the motor 170. To this end, the power transforming apparatus 100 may include a current sensing unit for detecting input power at a front end of the converter 140. In addition, in the present disclosure, control may be divided into a no-load, a low-load, a medium-load, and a high-load based on the magnitude of the input power and the speed of the motor 170 so as to control the power transforming apparatus 100 to perform a different PFC operation according to a size of the load.

Figure 2:
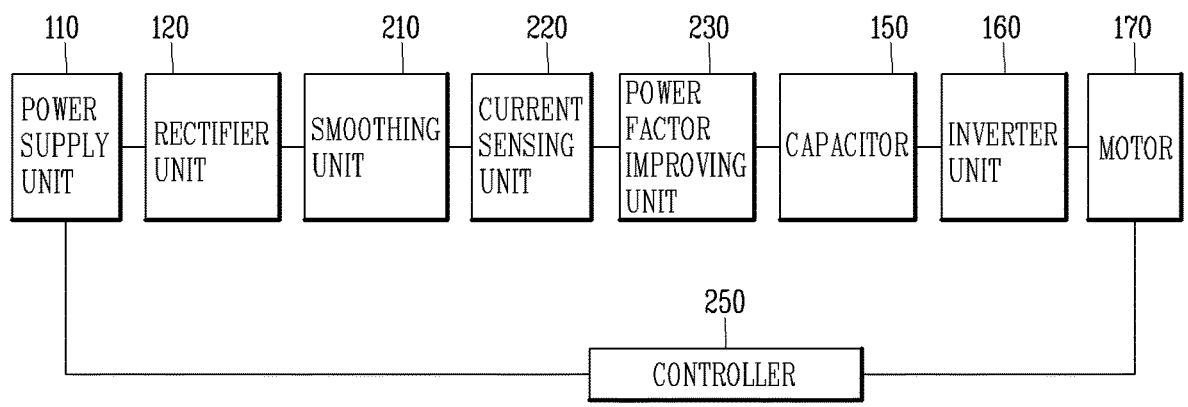
FIG. 2 is a block diagram showing a detailed configuration of the power transforming apparatus according to the present disclosure.

FIG. 2 is a block diagram showing a detailed configuration of the power transforming apparatus according to the present disclosure.

Referring to FIG. 2, the power transforming apparatus according to the present disclosure may include a power supply unit 110, a rectifier unit 120, a smoothing unit 210, a current sensing unit 220, a power factor improving unit 230 (interleaved PFC), a DC link capacitor 150, an inverter unit 160, a motor 170, and a controller 250. However, if necessary, the power transforming apparatus may include a greater number of components or may also be implemented with a smaller number of components.

The rectifier unit 120 rectifies commercial power output from the power supply unit 110, and the smoothing unit 210 smooths the rectified AC power.

The current sensing unit 220 is located between the smoothing unit 210 and the power factor improving unit 230 and is used to calculate the magnitude of the input power. In addition, if necessary, the current sensing unit 220 may be used together with a voltage sensing unit (not shown) to detect the speed of the motor.

The power factor improving unit 230 may be located between the current sensing unit 220 and the DC link capacitor 150, and includes at least two or more converter channels to perform an interleaved PFC operation. In the present disclosure, a high-efficiency PFC operation may be performed according to a no-load, a low-load, a medium-load, and a high-load by using three converter channels. The power transforming apparatus according to the present disclosure may control the PFC operation by dividing such a load section based on the speed of the motor and the magnitude of the input power (or, in some cases, only the magnitude of the input power).

At least part of the plurality of converter channels included in the power factor improving unit 230 performs switching operations to combine direct current (dc) voltages to improve power factor. The power factor improving unit 230 may include at least three converter channels, for example, a first converter channel, a second converter channel, and a third converter channel. Here, each converter channel is not limited to a specific position in the circuit of FIG. 1. In the present disclosure, an efficient PFC operation may be performed in an entire load section by determining the "number" of converter channels for performing a PFC operation and a switching time thereof.

The controller 250 controls the operation of each component of the power transforming apparatus, and here, it may be understood as performing the same function as that of the converter controller or the microcomputer.

The controller 250 does not perform a PFC operation in a no-load section. Furthermore, the controller 250 controls to perform the PFC operation with only one converter channel among the three converter channels in a low-load section. Since switching loss increases when two or more converter channels are simultaneously operated in the low-load section, the controller 250 controls to perform the PFC operation with only one converter channel to improve efficiency. Here, the selected one target converter channel is not limited to a specific converter channel. In other words, the controller 250 may apply a control algorithm to be randomly determined or selected differently each time when one target converter channel is determined at a low-load.

In one embodiment, the controller 250 may apply a control algorithm such that target converter channels are randomly determined or selected differently each time, even when determining an additional target converter channel or when determining a converter channel to be excluded from the PFC operation in a medium-load or high-load section.

Specifically, the controller 250 may arbitrarily select a second target converter channel or randomly determine a sequence of switching operations when it is determined from the low-load section to the medium-load/high-load section according to an increase in the speed of the motor and the magnitude of the input power. For example, when a target converter channel is added while performing the PFC operation using the second converter channel, a switching sequence may be determined in the order of the first converter channel→the third converter channel, or in the order of the third converter channel→the first converter channel.

Specifically, in a case where it is determined from the medium-load/high-load section to the low-load/medium-load section based on a decrease in the speed of the motor and the magnitude of the input power, when determining a converter channel to be excluded, the controller 250 may depend on an operation history (e.g., switching operation execution time) or randomly perform the determination. For example, when the load is decreased while operating the first to third converter channels, any one of them may be arbitrarily selected and excluded from the PFC operation.

In one embodiment, the controller 250 may set an enable switching time and a disable switching time differently for a plurality of converter channels in order to satisfy both efficient control and stable switching control. That is, the controller 250 may impose a hysteresis condition in determining the number of target converter channels. Here, the enable switching time (or the enable boundary point) may refer to a condition in which an arbitrary converter channel is switched on to perform a PFC operation. In addition, the disable switching time (or the disable switching boundary point) may refer to a condition in which an arbitrary converter channel is switched off to end the PFC operation.

In the present disclosure, since the operation of the power factor improving unit 230 is performed by controlling the "number" of target converter channels based on the speed of the motor and the magnitude of the input power, the number of PFC operable enable boundary points (or disable switching boundary points) corresponds to the number of target converter channels, respectively. For example, when two converter channels are determined as targets based on the speed of the motor and the magnitude of the input power (in the medium-load section), there is an enable boundary point and a disable switching boundary point for each of the two converter channels.

In addition, for stable phase switching, input power matching an enable boundary point (hereinafter, 'first boundary input power') may be set to a value larger than a magnitude of input power matching a disable switching boundary point (hereinafter, 'second boundary input power'). That is, a switching boundary point at which an arbitrary number of converter channels are disabled requires a smaller input power value than an enable boundary point corresponding thereto. For example, when the controller 250 determines that it is a low-load section to turn on a PFC operation for any one converter channel, first boundary input power matching an enable boundary point corresponding thereto is 900 W, and second boundary input power matching a disable switching boundary point may be 300 W less than that. In this case, it can be said that a hysteresis section of 200 W has been set.

Figure 3:
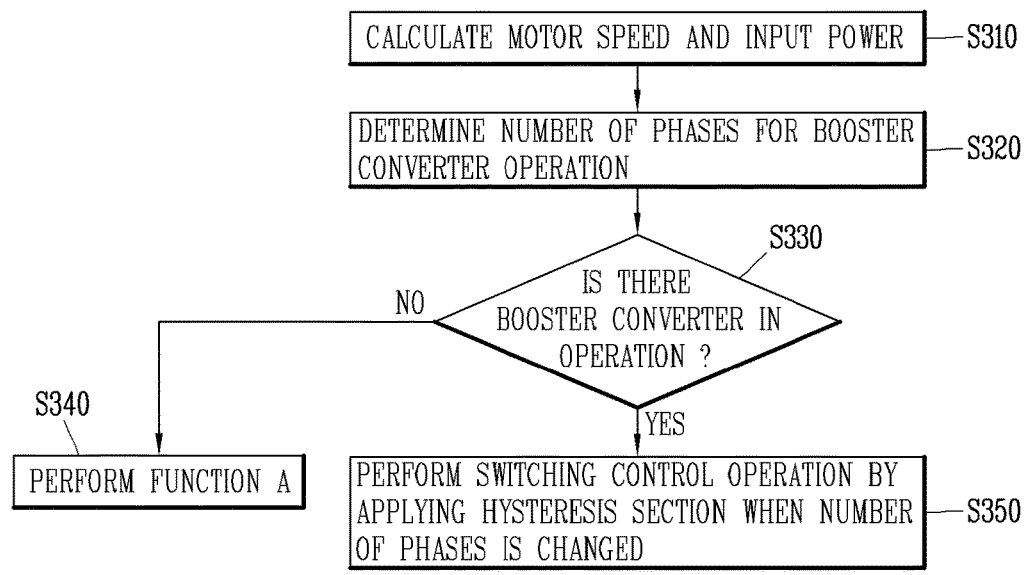
FIG. 3 is a representative flowchart for explaining an operating method of the power transforming apparatus according to the present disclosure.

FIG. 3 is a representative flowchart for explaining an operating method of the power transforming apparatus according to the present disclosure.

The operating method of the power transforming apparatus according to the present disclosure, which is an operating method of the power transforming apparatus for driving a motor by driving an inverter, the following operation is started as the inverter is driven. Furthermore, the operations disclosed in FIG. 3 are assumed to be performed by the controller (or 'microcomputer') of the power transforming apparatus unless otherwise stated.

When the inverter is driven, the speed of the motor and the input power are calculated by the controller of the power transforming apparatus (S310). In one embodiment, a magnitude of the input power may be detected by sensing currents flowing through inductors of a plurality of converter channels capable of performing a PFC operation. In addition, the speed of the motor may be detected through a separate motor speed sensing unit (not shown) and/or estimated based on a magnitude of an input current flowing through the converter/inverter.

Next, the controller performs an operation of determining the number of converter channels to perform a PFC operation, that is, the number of phases for a booster converter operation (S320). In the present disclosure, it has been described as an example in which the number of converter channels capable of performing a PFC operation is three. Thus, the number of phases capable of performing the booster converter operation, that is, the number of cases of operable converter channels, may be divided in a case where only one converter channel operates, a case where two converter channels operate, and a case in which all three converter channels operate.

In determining such a number of converter channels, the controller may determine whether there is a converter channel already in PFC operation, that is, a booster converter (S330), and may perform different operations corresponding thereto.

In this regard, on/off-start conditions of the PFC operation are preset for the plurality of converter channels. Specifically, the calculation of the above step S310 is continuously performed, and when the speed of the motor is above a first threshold speed value (e.g., 18 Hz) and the magnitude of the input power is above a first threshold power value (e.g., 900 W), an on-start condition of the PFC operation is satisfied. That is, when the motor drives to reach the first threshold speed value and the magnitude of the input power becomes the first threshold power value, the PFC operation is carried out. On the other hand, when the speed of the motor is below a second threshold speed value (e.g., 15 Hz) and the magnitude of the input power is below a second threshold power value (e.g., 300 W) according to the calculation of the above step S310, an off-end condition of the PFC operation is satisfied. That is, when the motor being driven is decreased to the second threshold speed value and the magnitude of the input power is decreased to the second threshold power value, the PFC operation is ended.

In this way, the reason for setting the first threshold power value (and/or the first threshold speed value) matching the on-start condition of the PFC operation and the second threshold power value (and/or the second threshold speed value) matching the off-start condition of the PFC operation to different values (i.e., imposing a hysteresis condition) is to allow the PFC operation to be performed more stably in consideration of a fluctuation of a load.

In one embodiment, the controller may operate to turn on the PFC operation as long as the magnitude of the input power satisfies the first threshold power value (e.g., 900 W) or more (even without detecting the speed of the motor), and to turn on the PFC operation long as the magnitude of the input power is decreased to the second threshold power value (e.g., 300 W) or less (even without detecting the speed of the motor).

Subsequently, based on the determination (S330), the controller determines a target converter channel for performing the PFC operation. Specifically, when there is no converter channel in operation, the controller performs function A operation (S340). Here, the function A operation refers to an operation of selecting a converter channel for performing a PFC operation using a predetermined function.

In one embodiment, the predetermined function may be a random function. Specifically, when there is no converter channel in PFC operation, the controller may determine a target converter channel using a random function. Accordingly, whenever determining a target converter channel for performing the PFC operation, the converter channel for the switching operation may be arbitrarily determined.

For example, among the first converter channel, the second converter channel, and the third converter channel, as a converter channel for initially performing the PFC operation, any one arbitrarily selected from among the first to third converter channels may be determined as the target converter channel. This denotes that when there is no converter channel in the PFC operation, the target converter channel for initially performing the PFC operation is not predetermined as a specific converter channel.

When a converter channel for performing an initial PFC operation is specified (e.g., the first converter channel), a stress of a power semiconductor corresponding to the converter channel is added, thereby further shortening the life of the specific converter channel. Accordingly, when a converter channel for performing an initial PFC operation is randomly determined as in the present disclosure, the stress of the power semiconductor may be dispersed.

In another embodiment, the controller operates to store a switching history of a converter channel that has previously performed the PFC operation, and to exclude a switching time of the converter channel that has been operated immediately before from an initial driving sequence based on the stored switching history when the predetermined function is applied.

Specifically, when the driving of the inverter is started and the PFC operation is performed in the order of two converter channels, for example, the first converter channel→the third converter channel at a first time point, data on the converter channels that have performed the operation and the switching time/sequence may be stored in the memory or microcomputer associated therewith. In addition, when the PFC operation is performed again at a second time point after the first time point, the first converter channel may be excluded as a target converter channel for initially performing the PFC operation based on the stored data. For example, when the number of converter channels for performing the PFC operation is determined to be three at the second time point, the switching time may be determined such that the second converter channel or the third converter channel is switched first, and the first converter channel is switched later. Accordingly, the stress of the power semiconductor corresponding to the first converter channel that has been operated immediately before does not increase, and the stress may be evenly distributed among the three converter channels.

In another embodiment, the controller pre-stores an optimal PFC operation sequence for stress dispersion in the memory, microcomputer or the like associated therewith, and then controls to perform switching based on the pre-stored PFC operation sequence when determining a target converter channel for performing a PFC operation. In this case, the pre-stored PFC operation sequence may use a known algorithm or the like to determine a switching sequence such that the stress of each power semiconductor corresponding to at least three converter channels can be appropriately distributed.

On the other hand, when there is a converter channel already in operation based on the determination (S330), it is determined that it is a situation in which the number of phases, that is, the number of converter channels for performing a PFC operation, is changed based on the calculated speed of the motor and the magnitude of the input power.

When it is not required to change the number of converter channels for performing the PFC operation, a previous operation may be continued. On the contrary, when it is required to change the number of converter channels for performing the PFC operation, a hysteresis section is applied to perform a switching control operation (S350).

Here, the hysteresis section is set differently for each converter channel. Specifically, an enable switching time and a disable switching time may be set differently for each converter channel. The enable switching time and the disable switching time may be preset to correspond to the detected magnitude of the input power. This will be described in more detail below with reference to FIGS. 6A and 6B.

A situation in which the number of converter channels for performing a PFC operation is changed may be divided into 1) a case where the number of target converter channels for performing a PFC operation increases than before and 2) a case where the number of target converter channels decreases.

In the case of 1), the controller determines a switching timing of a converter channel to be added based on the speed of the motor and the magnitude of the input power. For example, when it is sufficient with one converter channel, only one converter channel operates for switching, and another converter channel is additionally added for switching only when the speed of the motor and the magnitude of input power satisfy a driving condition of two converter channels.

Similarly, even in the case of 2), the controller determines a switching time of a converter channel to be excluded from target converter channels based on the speed of the motor and the magnitude of the input power. Here, since different enable switching time and disable switching time are applied to the plurality of converter channels based on the magnitude of the input power, the number of the switching boundary points is set to be twice that of drivable converter channels.

For example, even when the speed of the motor and the magnitude of the input power are reduced to satisfy a driving condition of two converter channels while driving three converter channels, the driving of one of the two converter channels may be turned off (without switching one of them immediately) when the speed of the motor and/or the magnitude of the input power is further reduced to a preset disable switching boundary point. However, it should be noted that, in the present disclosure, a converter channel to be initially operated, a switching time of the converter channel, and a PFC operation sequence are not predetermined, and thus a switching boundary point matching each converter channel is not preset. That is, the switching boundary point is matched to the 'number' of the target converter channels. This will be described again with reference to FIGS. 6A and 6B.

As described above, the present disclosure may determine converter channels for initially performing a PFC operation, randomly or by reflecting an operation history, in relation to driving a motor, without specifying them in advance, thereby preventing the life of a specific converter switch from being shortened due to a stress added thereto. In addition, the present disclosure provides a converter control algorithm that performs a PFC operation at the maximum efficiency while excluding unnecessary switching based on the speed of the motor and the magnitude of the. Moreover, in determining the 'number' of target converter channels for a PFC operation, hysteresis switching may be performed in consideration of a fluctuation of a load as well as the speed of the motor and the magnitude of the input power, thereby performing more stable PFC switching control.

Figure 4A:
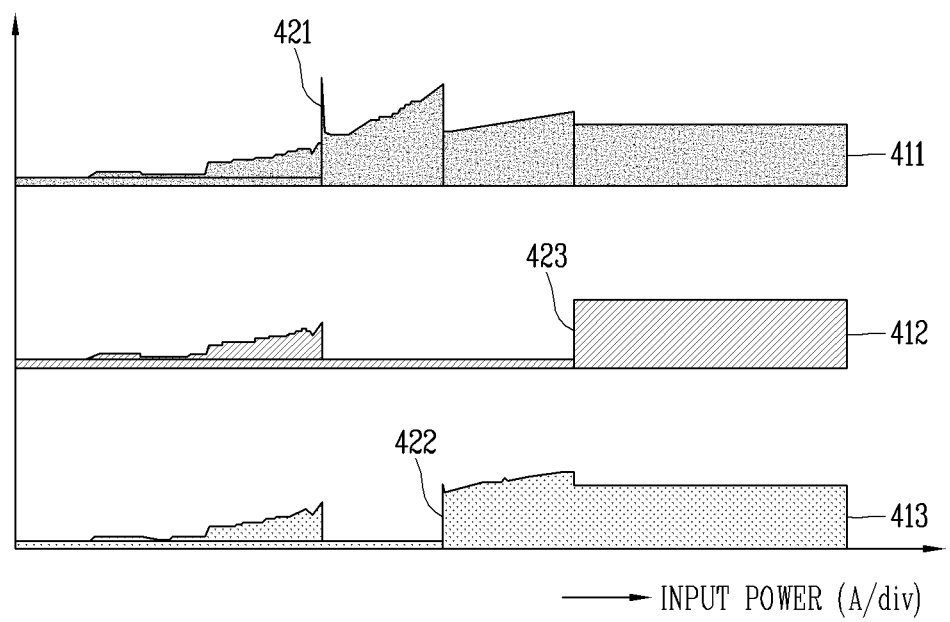
FIGS. 4A and 4B are graphs for explaining a method of changing an operation sequence of a plurality of converter channels of the power transforming apparatus according to the present disclosure.
Figure 4B:
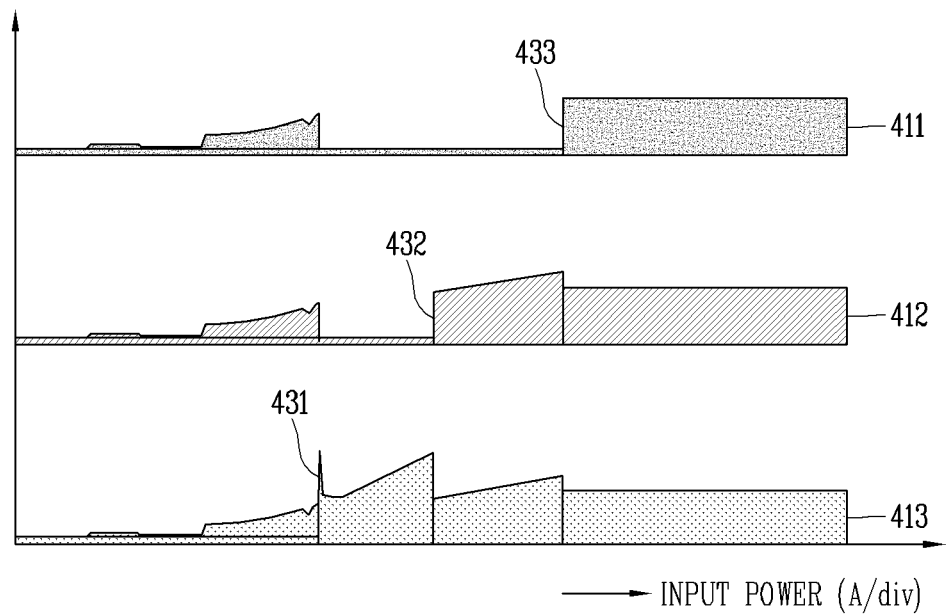

FIGS. 4A and 4B are graphs for explaining a method of changing an operation sequence of a plurality of converter channels of the power transforming apparatus according to the present disclosure.

FIGS. 4A and 4B illustrate an example in which three converter channels are individually controlled according to the present disclosure. Here, individually controlling a plurality of converter channels does not denote that each converter channel is connected to an additional sensor or the like to be controlled separately, but in the present disclosure, denotes determining the number of converter channels for performing a PFC operation and controlling its switching time. Furthermore, for convenience of description, converter channels are referred to as first to third converter channels 411, 412, 413, and each converter channel is not limited to a specific location or does not denote a specific converter channel.

In FIG. 4A, as a magnitude of input power (A/div) increases, the first converter channel 411 is first switched on for a PFC operation. Specifically, when the magnitude of the input power (A/div) reaches an enable boundary point 421 for the first converter channel 411, the first converter channel 411 starts a switching operation.

Here, since the first converter channel 411 is a converter channel arbitrarily selected using a random function, as illustrated in FIG. 4B, the third converter channel 413 may be selected as a target converter channel for initially performing the PFC operation. In this case, as illustrated in FIG. 4B, when the magnitude of input power (A/div) reaches an enable boundary point 431 for the third converter channel 413, the third converter channel 413 starts a switching operation. Here, since the two enable boundary points 421, 431 are the same condition for enabling one converter channel, the magnitude of the input power matching them is the same.

Referring back to FIG. 4A, as the magnitude of the input power (A/div) increases, when the first converter channel 411 is switched on, and then the magnitude of the input power (A/div) reaches an enable boundary point 422 matching two converter channels, the third converter channel 413 is switched on. Then, when the magnitude of the input power (A/div) further increases and reaches an enable boundary point 423 at which all three converter channels must operate, the remaining second converter channel 412 is switched on. That is, in FIG. 4A, as the magnitude of the input power (A/div) increases, a switching sequence is determined from the first converter channel 411→the third converter channel 413→the second converter channel 412.

On the other hand, referring to FIG. 4B, as the magnitude of the input power (A/div) increases, when the third converter channel 413 is switched on, and then the magnitude of the input power (A/div) reaches an enable boundary point 432 matching two converter channels, the second converter channel 412 is switched on. Then, when the magnitude of the input power (A/div) further increases and reaches an enable boundary point 433 at which all three converter channels must operate, the remaining first converter channel 411 is switched on. That is, in FIG. 4B, as the magnitude of the input power (A/div) increases, a switching sequence is determined from the third converter channel 413→the second converter channel 412→the first converter channel 411.

The switching timing and switching sequence of the plurality of converter channels 411, 412, 413 illustrated in FIGS. 4A and 4B are not limited thereto, and various arbitrary combinations can be made. In addition, when the number of converter channels for performing the PFC operation is decreased as the magnitude of the input power (A/div) decreases, an arbitrary converter channel may be selectively excluded regardless of a previous switching sequence. Alternatively or additionally, when a previous switching sequence is stored as history information and the number of converter channels for performing a PFC operation must be decreased, a converter channel to be excluded may be selected based on the stored history information.

Figure 5:
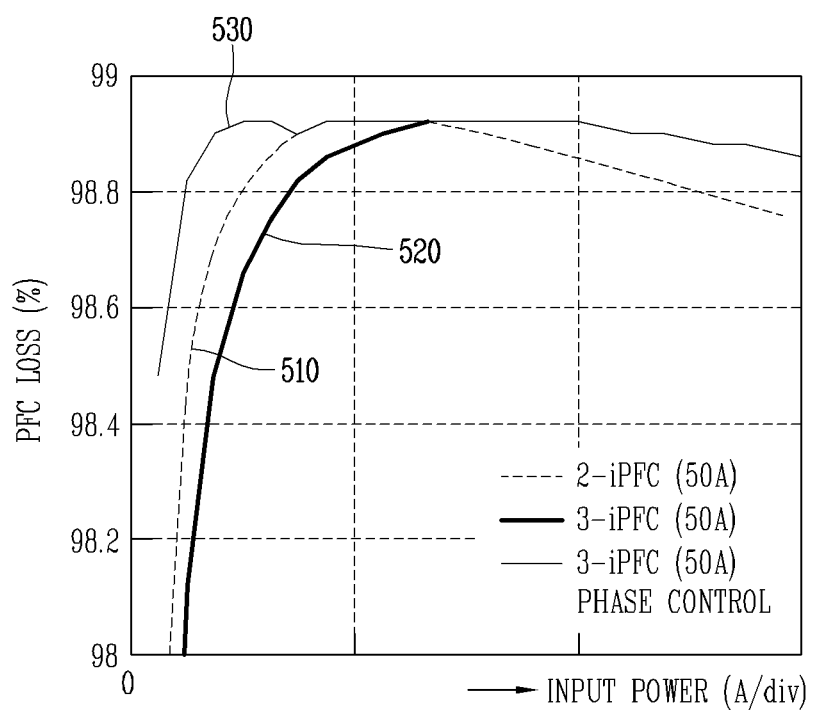
FIG. 5 is a graph for explaining the number of converter channels having the maximum efficiency for each load section in the power transforming apparatus according to the present disclosure.

FIG. 5 is a graph for explaining the number of converter channels having the maximum efficiency for each load section in the power transforming apparatus according to the present disclosure. FIG. 5 is a graph showing a PFC efficiency loss in a case of performing a PFC operation with two converter channels (510), a case of performing a PFC operation with three converter channels (520), and a case of performing a different PFC operation for each load section with three converter channels, but controlling phases thereof (530).

In the present disclosure, a load operation section may be divided according to the 'number' of target converter channels determined based on the magnitude of the input current and the speed of the motor (or only the magnitude of the input current). Specifically, a section having the maximum efficiency during a PFC operation with only one converter channel based on the magnitude of the input current and the speed of the motor may be defined as a 'low-load section'.

In the low load section of FIG. 5 (a first partition region based on the X-axis), the case of performing the PFC operation with three converter channels (520) has a lower efficiency than the case of performing the PFC operation with two converter channels (510). It can be seen that, in the low-load section, when the three converter channels are all switched, the operating efficiency is rather reduced.

Furthermore, it can be seen that the operating efficiency is higher in the case of controlling the phases of three converter channels according to the present disclosure (530) rather than in the case of performing the PFC operation with the two converter channels (510), even in the same low-load section of FIG. 5. This denotes that, when the PFC operation is sufficient with only one converter channel, the PFC operation using only one converter channel is always more advantageous than the case of using two converter channels.

In the medium-load and high-load sections (second and third partition regions based on the X-axis) of FIG. 5, when the PFC operation is operated with two converter channels, it can be seen that the efficiency decreases from the medium-load (a second partition region based on the X-axis) to the high-load (a third partition region based on the X-axis). On the contrary, both in the case of performing the PFC operation with three converter channels (520) and the case of controlling the phases of the three converter channels (530), it can be seen that the high efficiency is maintained at a medium-load or more.

Therefore, it can be seen that the case of controlling the phases of the three converter channels (530) maintains a high PFC efficiency in every entire operation section of a low-load, a medium-load, and a high-load. Accordingly, in the present disclosure, a PFC operation is performed using one arbitrary converter channel in the low-load section, the PFC operation is performed using two arbitrary converter channels in the medium-load section, and the PFC operation is performed using three arbitrary converter channels in the high-load section. Accordingly, high PFC efficiency can be maintained in the entire load section.

Figures 6A, 6B:
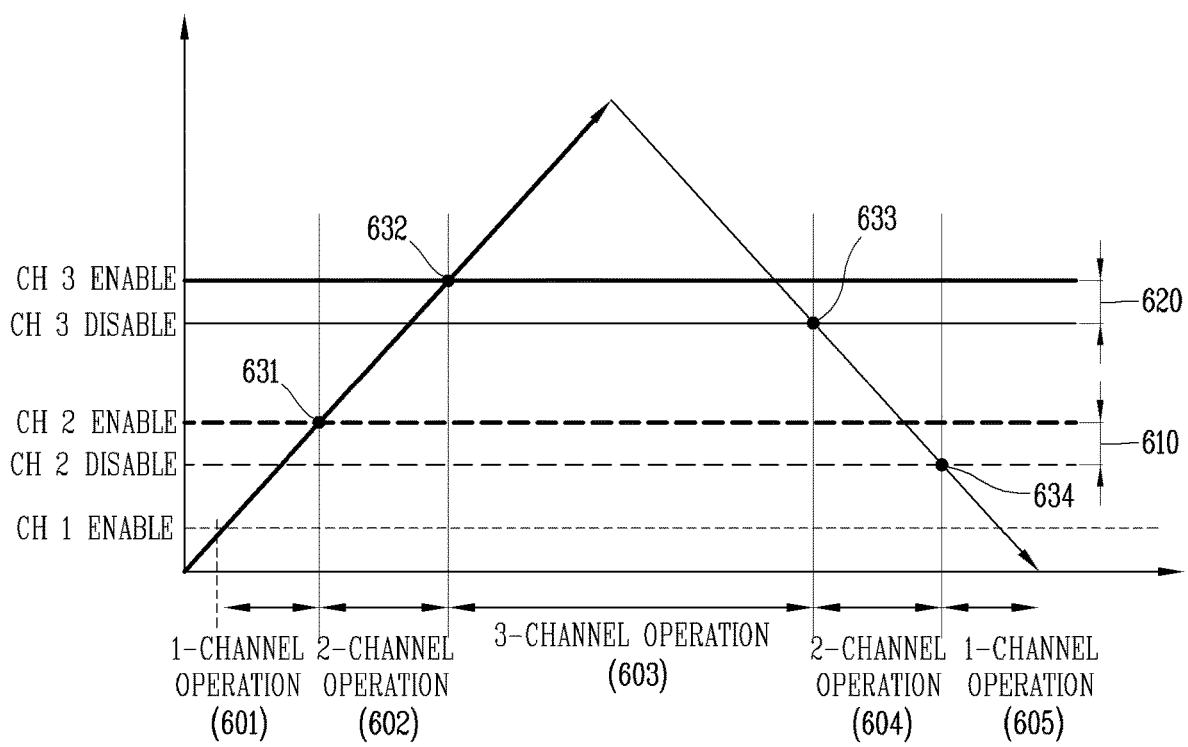
FIGS. 6A and 6B are diagrams for explaining the application of a hysteresis switching mode when determining a PFC operation and target converter channels based on input power in the power transforming apparatus according to the present disclosure.

FIGS. 6A and 6B are diagrams for explaining the application of a hysteresis switching mode when determining a PFC operation and target converter channels based on input power in the power transforming apparatus according to the present disclosure.

More specifically, FIG. 6A shows an example table of an enable switching time (or an enable boundary point) and a disable switching time (or a disable switching boundary point) that match the number of target converter channels for performing a PFC operation. Furthermore, FIG. 6B is a diagram showing that a hysteresis section is applied to a case where the number of converter channels for performing a PFC operation increases and a case where the number of converter channels decreases using the table of FIG. 6A.

Each row of the table shown in FIG. 6A denotes the number of target converter channels for performing the PFC operation. That is, CH1, CH2, and CH3 do not refer to a specific converter channel, but refers to a case where the number of converter channels is one, two, or three, respectively.

As illustrated, the input power value of the enable boundary point of CH1 (the number of target converter channels is one) is 900 W, the input power value of the disable switching boundary point thereof is 300 W, and a hysteresis section of about 600 W is applied thereto.

The input power value of the enable boundary point of CH2 (the number of target converter channels is two) is 1500 W, the input power value of the disable switching boundary point thereof is 1300 W, and a hysteresis section of about 200 W is applied thereto. Therefore, when the input power condition of 1500 W is once satisfied to correspond to the CH2 section, even though the magnitude of the input power thereafter is reduced to 1400 W, the PFC operation using two target converter channels is continuously maintained.

The input power value of the enable boundary point of CH3 (the number of target converter channels is three) is 2500 W, and the input power value of the disable switching boundary point thereof is 2300 W, and a hysteresis section of about 200 W is applied thereto. Therefore, here too, when the input power condition of 2500 W is once satisfied to correspond to the CH3 section, even though the magnitude of the input power thereafter is reduced to 2400 W, the PFC operation using three target converter channels is continuously maintained. On the contrary, when the magnitude of the input power is reduced to 2300 W or less, the PFC operation is performed with two arbitrary target converter channels.

Meanwhile, although not shown, in relation to the no-load section, a hysteresis section may also be applied to a switching boundary point matching the on/off of the PFC operation. For example, an input power value for switching on one converter channel in the no-load period may be set to 900 W or more. This is a condition for starting the PFC operation, and in this case, the speed of the motor may be required to satisfy 18 Hz or more. Furthermore, for example, an input power value for switching off all converter channels may be set to 300 W or less. In this case, it can be said that a hysteresis section of about 600 W is provided for a switching boundary point for whether to perform the PFC operation. This is a condition for the end of the PFC operation, and in this case, the speed of the motor may be required to satisfy 15 Hz or less.

Subsequently, in a graph of FIG. 6B, a hysteresis switching mode is applied in moving between sections 601, 605 in which the PFC operation is performed with only one converter channel, sections 602, 604 in which the PFC operation is performed with two converter channels, and a section 603 in which the PFC operation is performed using all three converter channels.

A left arrow graph of FIG. 6B shows a case where the number of target converter channels for performing the PFC operation increases as the input power (and the speed of the motor) increases. Specifically, the number of target converter channels increases whenever reaching the boundary points 631, 632 subsequent to starting the PFC operation (denoting that arbitrarily selected one converter channel operates the PFC operation).

For example, when the input power (and/or the speed of the motor) increases and reaches the first boundary point 631, the PFC operation is performed with two converter channels. Furthermore, when the input power (and/or the speed of the motor) further increases and reaches the second boundary point 632 while performing the PFC operation using two converter channels, the PFC operation is performed with three converter channels.

On the other hand, a right arrow graph of FIG. 6B shows a case where the number of target converter channels for performing the PFC operation decreases as the input power (and the speed of the motor) decreases. Specifically, whenever reaching the switching boundary points 633, 634 while performing the PFC operation with three converter channels, the number of target converter channels is decreased by one.

For example, when the input power (and/or the speed of the motor) decreases and reaches the first switching boundary point 633 while performing the PFC operation using three converter channels, the PFC operation is maintained with two arbitrarily selected converter channels. Furthermore, when the input power (and/or the speed of the motor) further decreases and reaches the second switching boundary point 634 while performing the PFC operation using two converter channels, the PFC operation is performed with one arbitrarily selected converter channel. Furthermore, when the input power (and/or the speed of the motor) continues to decrease and reaches a PFC switching-off condition (e.g., 300 W or less) even after reaching the second switching boundary point 634, the PFC operation is ended.

On the other hand, in FIG. 6B, it has been described as an example in which the number of target converter channels sequentially increases from 1→2→3 and then decreases to 3→2→1, but the present disclosure is of course not limited thereto. For example, subsequent to reaching the first switching boundary point 633, when the input power increases and reaches the second boundary point 632, the PFC operation is performed again with three converter channels. In addition, for example, when the input power decreases and reaches the second switching boundary point 634 while performing the PFC operation with two arbitrarily selected converter channels upon reaching the first boundary point 631, the PFC operation will be performed with one arbitrarily selected converter channel.

As described above, in the present disclosure, even when the number of target converter channels is the same, stable switching control is allowed even with a load fluctuation by applying a different magnitude of reference input power depending on whether it is an enable boundary point or a disable switching boundary point.

Figure 7A:
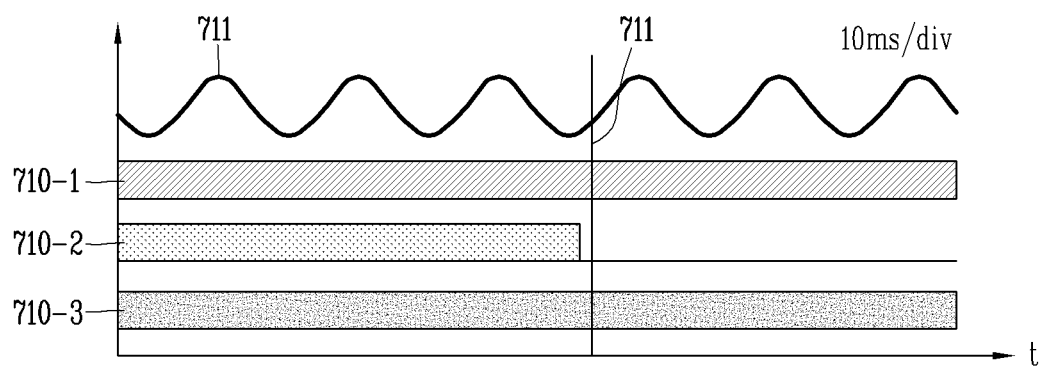
FIGS. 7A and 7B are exemplary graphs for explaining a PWM phase change according to a change of target converter channels performing a PFC operation in the power transforming apparatus according to the present disclosure.
Figure 7A:
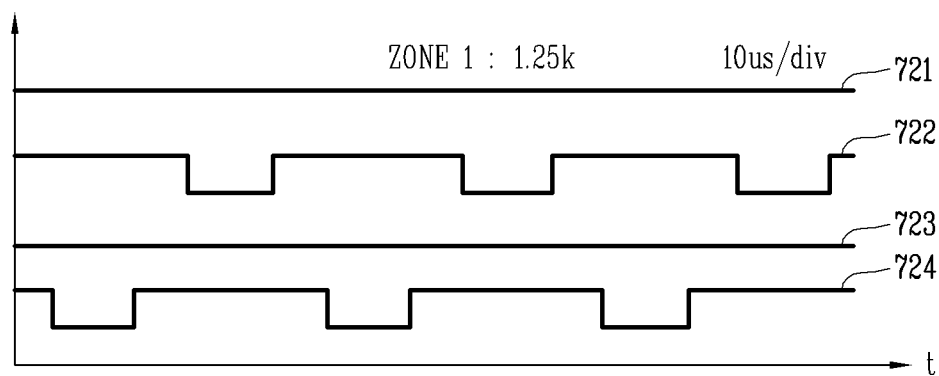
Figure 7B:
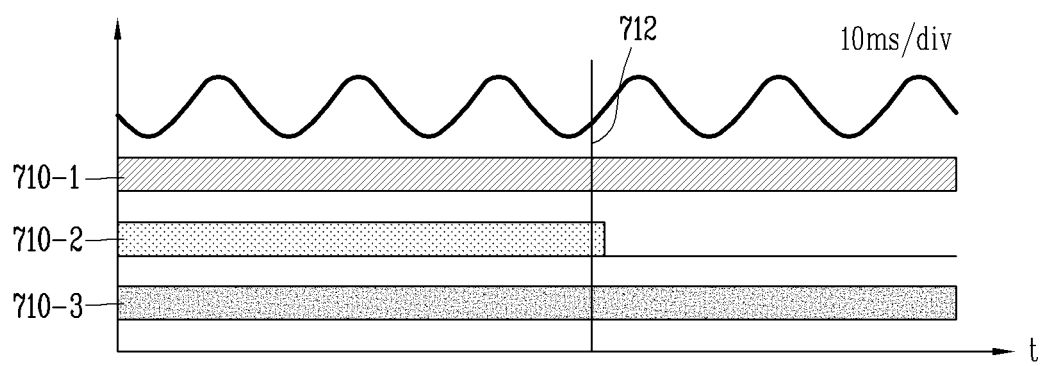
Figure 7B:
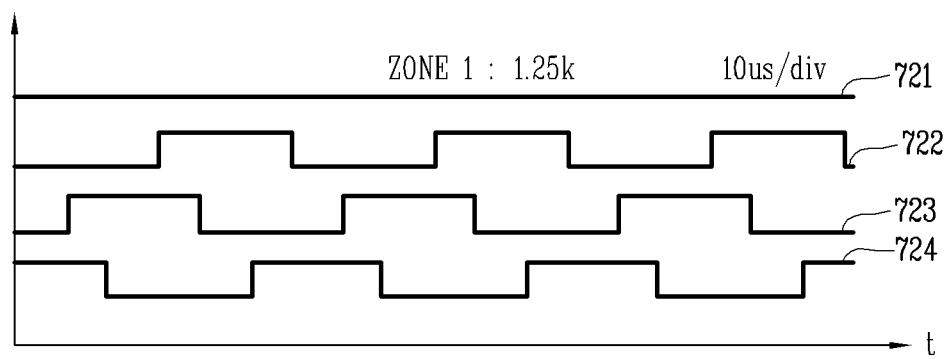

FIGS. 7A and 7B are exemplary graphs for explaining a PWM phase change according to a change of target converter channels performing a PFC operation in the power transforming apparatus according to the present disclosure.

In FIG. 7A, (a) shows a change of the PFC operation for an input current (shown waveform) and a plurality of converter channels 710_1, 710_2, 710_3 over time (t), and (b) shows a PWM phase change at a specific time 711 in (a) of FIG. 7A. At the specific time point 711, one converter channel 710_2 among the plurality of converter channels 710_1, 710_2, 710_3 is in a PFC switching-off state. In other words, FIG. 7A shows a case where the PFC operation is performed with two converter channels, and a switching operation is performed such that the PWM phases 722, 723, 724 of the plurality of converter channels satisfy 180 degrees with respect to an input current 721 at this time.

To this end, when only two arbitrarily selected converter channels among the first to third converter channels are enabled as the input current decreases, the controller of the power transforming apparatus according to the present disclosure may determine a switching timing such that the (PWM) phases of the enabled two converter channels become 180 degrees to control the power factor improving unit.

Similarly, in FIG. 7B, (a) shows a change of the PFC operation for an input current and a plurality of converter channels 710_1, 710_2, 710_3 over time (t), and (b) shows a PWM phase change at a specific time 712 in (a) of FIG. 7B. At the specific time point 712, all of the plurality of converter channels 710_1, 710_2, 710_3 are in a PFC switching-on state. In other words, FIG. 7B shows a case where the PFC operation is performed with three converter channels, and a switching operation is performed such that the PWM phases 722, 723, 724 of the plurality of converter channels satisfy 120 degrees with respect to an input current 721 at this time.

To this end, when all of the first to third converter channels are enabled as the input current increases, the controller of the power transforming apparatus according to the present disclosure may determine a switching timing such that the (PWM) phases of the first to third converter channels become 120 degrees to control the power factor improving unit.

Figure 8:
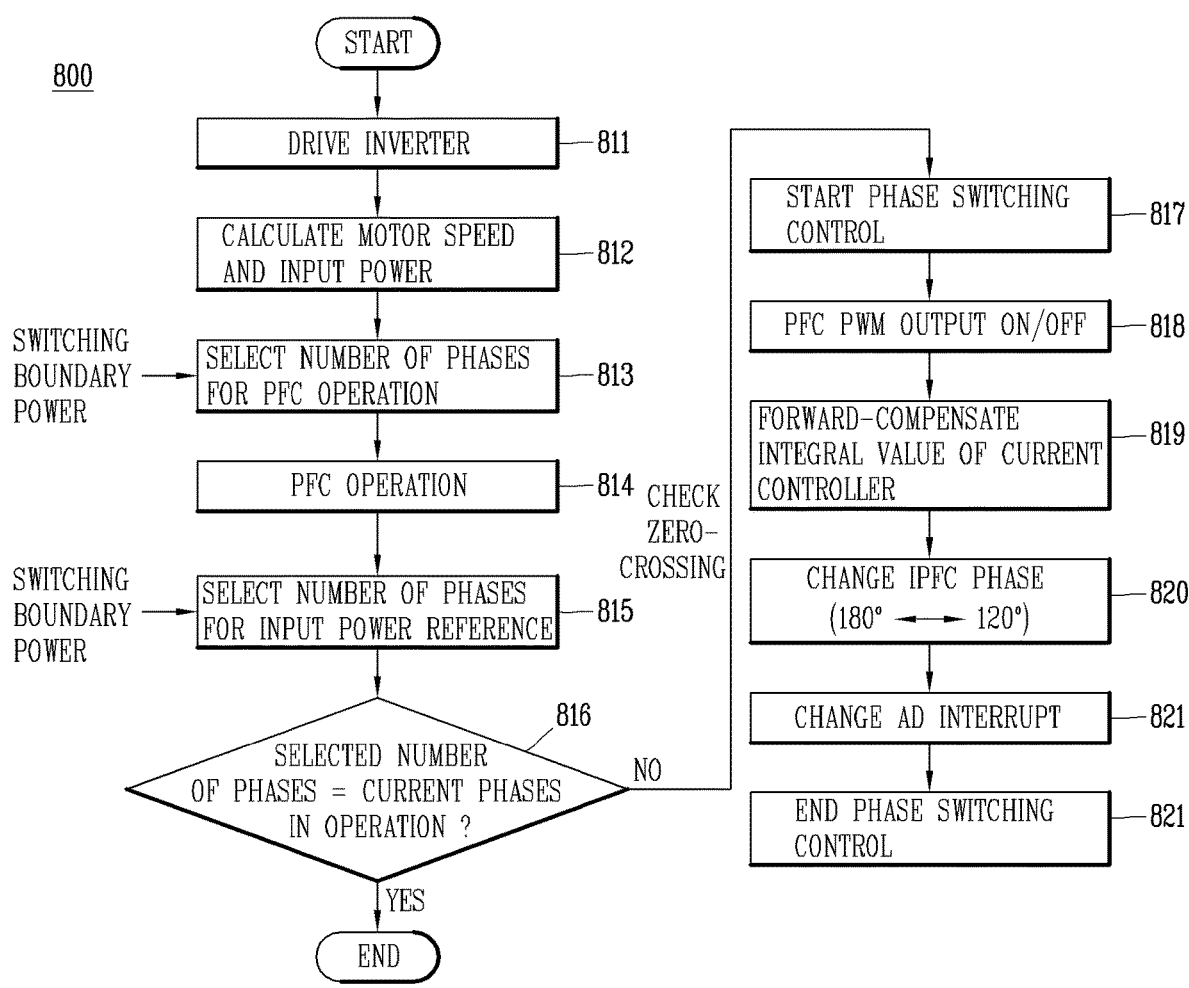
FIG. 8 is a flowchart specifically illustrating a method of performing a switching control mode of a converter channel in an operating method of the power transforming apparatus according to the present disclosure.

FIG. 8 is a flowchart specifically illustrating an operating method of performing a switching control mode of a converter channel in an operating method of the power transforming apparatus according to the present disclosure. The operations disclosed in the operation method of FIG. 8 may be performed by a controller (or 'microcomputer') that controls each configuration of the power transforming apparatus.

The operation method illustrated in FIG. 8 starts with a step of driving an inverter (811). When the inverter is driven, the controller performs a step of calculating a speed of a motor and a magnitude of input power (812). When the calculated speed of the motor and the magnitude of the input power satisfy a condition for starting the PFC operation, the number of phases for performing the PFC operation, that is, the number of target converter channels is selected (813). Here, the above-described hysteresis section is applied to allow stable switching control to be performed. The PFC operation is performed with the selected number of target converter channels (814).

Subsequently, the number of phases, that is, the number of converter channels, is selected based on the input power (815). Specifically, the controller of the power transforming apparatus, performs the PFC operation with one arbitrarily selected converter channel, for example, in a low-load section. In a medium-load section, the PFC operation is performed with two arbitrarily selected converter channels. Furthermore, the PFC operation is performed with all converter channels, that is, three converter channels in a high-load section. Furthermore, in this case, when selecting the number of phases, that is, the number of converter channels, based on the input power, the aforementioned hysteresis section is applied.

Next, it is determined whether the number of selected phases, that is, the number of arbitrarily selected converter channels, is the same as the number of phases of converter channels currently in the PFC operation (816).

As a result of determination 816, when the selected number of phases and the number of converter channels in the PFC operation are the same, there is no additional operation. At this time, a process of continuously monitoring whether the number of phases is changed again by calculating the speed of the motor and the magnitude of the input power is repeated.

As a result of the determination 816, when the selected number of phases and the number of converter channels in the PFC operation are different, that is, when the number of target converter channels increases or decreases than before, a zero-crossing is checked, and then phase switching control is started (817).

In the phase switching control, the controller turns on/off a PWM output corresponding to the PFC operation (818), and then forward-compensates an integral value of a current controller (819). Then, an iPFC phase is changed (820). For example, when the number of converter channels decreases from three to two, the PWM output is controlled to have the iPFC phase from a phase difference of 120 degrees to 180 degrees. On the contrary, for example, when the number of converter channels increases from two to three, the PWM output is controlled to have the iPFC phase from a phase difference of 180 degrees to 120 degrees. Next, by changing an AD interrupt (821), the phase switching control is ended (822).

As described above, the present disclosure may determine a converter channel on which a PFC operation is to be initially performed, randomly or by reflecting an operation history, in relation to driving a motor, without specifying it in advance, thereby preventing the life of a specific converter switch from being shortened due to a stress added thereto. Furthermore, a PFC operation may be performed with only one arbitrary converter at a low-load, thereby improving low-load efficiency while excluding unnecessary converter switch driving. In addition, it is possible to provide a converter control algorithm that performs a PFC operation at the maximum efficiency while excluding unnecessary switching based on the speed of the motor and the magnitude of the input power. Moreover, in determining the 'number' of target converter channels for a PFC operation, hysteresis switching may be performed in consideration of a fluctuation of a load as well as the speed of the motor and the magnitude of the input power, thereby performing more stable PFC switching control.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

Features, structures, effects, and the like described in the above embodiments are included in at least one embodiment, and are not necessarily limited to only one embodiment. Moreover, the features, structures, effects, and the like illustrated in each embodiment may be combined or modified for other embodiments by a person having ordinary skill in the field to which the embodiments belong. Therefore, contents related to such combinations and modifications should be construed as being included in the scope of the embodiments.

In addition, although the present disclosure has been described around embodiments thereof, it is only an example and does not limit the present disclosure. It will be apparent to those skilled in this art that various modifications and applications which are not illustrated in the above may be made thereto without departing from the gist of the present embodiment. For example, each component specifically shown in the embodiment may be implemented in various modifications. Furthermore, all differences associated with the modifications and applications should be construed to be included in the scope of the present disclosure as defined in the accompanying claims.

What is claimed is:

1. A power transforming apparatus for driving an inverter to drive a motor, the power transforming apparatus comprising:
    a rectifier configured to rectify an input AC voltage;
    a power factor improving unit configured to perform a power factor correction (PFC) operation that improves power factor on a rectified voltage output from the rectifier, the power factor improving unit comprising a plurality of converter channels;
    a DC link capacitor configured to store an output voltage of the power factor improving unit;
    a current sensor disposed between the rectifier and the power factor improving unit; and
    a controller configured to (i) based on an input power and a speed of the motor calculated using an input current that is sensed by the current sensor while the inverter is driven, determine a number of converter channels to perform the PFC operation among the plurality of converter channels, (ii) determine target converter channels to perform the PFC operation among the plurality of converter channels, and (iii) determine a switching time, based on at least one converter channel being in operation,
    wherein the controller is further configured to (i) store a switching history of a converter channel that has previously performed the PFC operation, and (ii) based on the stored switching history, determine a switching driving sequence of the target converter channels to perform the PFC operation after excluding a switching time of the converter channel that has been operated immediately before from an initial driving sequence.

2. The power transforming apparatus of claim 1, wherein the controller is configured, based on no converter channel being in operation when determining the number of converter channels, to determine a switching driving sequence of the target converter channels by using a predetermined function, wherein the predetermined function is a random function.

3. The power transforming apparatus of claim 1, wherein the power factor improving unit comprises a first converter channel, a second converter channel, and a third converter channel, and
    wherein the current sensor is configured to sense the input current through a shunt resistor connected in series to each of the first to third converter channels.

4. The power transforming apparatus of claim 3, wherein the driving of the motor is determined to be any one of a low-load operation section, a medium-load operation section, and a high-load operation section based on a magnitude of the sensed input current and the speed of the motor, and
    wherein the controller is configured to determine the number of target converter channels to perform a PFC operation for each load operation section.

5. The power transforming apparatus of claim 4, wherein the controller is configured to determine an arbitrarily selected converter channel among the first to third converter channels as a target converter channel in the low-load operation section to perform a PFC operation.

6. The power transforming apparatus of claim 4, wherein the controller is configured, based on the number of target converter channels being determined based on a change of the input power, to apply an enable switching time and a disable switching time of each of the first to third converter channels that corresponds to a magnitude of the input power.

7. The power transforming apparatus of claim 4, wherein a first input power corresponding to a switching time of a target converter channel that is determined when a load operation section is changed as the sensed input current decreases is smaller than a second input power corresponding to a switching time of a target converter channel that is determined when a load operation section is changed as the sensed input current increases.

8. The power transforming apparatus of claim 4, wherein the controller is configured, based on two of the first to third converter channels being enabled and the sensed input current decreasing, to determine a switching time such that phases of the two enabled converter channels become 180 degrees.

9. The power transforming apparatus of claim 4, wherein the controller is configured, based on the first to third converter channels being enabled and the sensed input current increasing, to determine a switching time such that phases of the first to third converter channels become 120 degrees.

10. An operating method of a power transforming apparatus for driving an inverter to drive a motor, the operating method comprising:
    detecting a magnitude of input power and a speed of the motor when the inverter is driven;
    a power factor improving unit configured to perform a power factor correction (PFC) operation that improves power factor on a rectified voltage output from the rectifier
    based on the detected input power and the speed of the motor, determining a number of converter channels to perform a power factor correction (PFC) operation that improves power factor on a rectified voltage output on a plurality of converter channels;
    determining target converter channels to perform the PFC operation among the plurality of converter channels and a switching timing thereof according to whether at least one converter channel is in operation;
    storing a switching history of a converter channel that has previously performed the PFC operation; and
    based on the stored switching history, determining a switching driving sequence of the target converter channels to perform the PFC operation after excluding a switching time of the converter channel that has been operated immediately before from an initial driving sequence.

11. The operating method of claim 10, comprising:
    determining target converter channels to perform the PFC operation and a switching driving sequence thereof using a random function when there is no converter channel in operation.

12. The operating method of claim 10, further comprising:
    applying an enable switching time and a disable switching time of each of the first to third converter channel corresponding to the magnitude of input power, and determining the number of converter channels based on a change of the detected magnitude of input power.

13. The operating method of claim 12, wherein a first input power corresponding to a switching time of a target converter channel that is determined when a load operation section is changed as the detected input current decreases is smaller than a second input power corresponding to a switching time of a target converter channel that is determined when a load operation section is changed as the detected input current increases.

14. An air conditioner comprising a compressor to which a power transforming apparatus is applied, wherein the power transforming apparatus comprises:
    a rectifier configured to rectify an input AC voltage;
    a power factor improving unit configured to perform a power factor correction (PFC) operation that improves power factor on a rectified voltage output from the rectifier, the power factor improving unit comprising a plurality of converter channels;
    a DC link capacitor configured to store an output voltage of the power factor improving unit;
    a current sensor disposed between the rectifier and the power factor improving unit; and
    a controller configured to (i) based on an input power and a speed of a motor calculated using an input current that is sensed by the current sensor while an inverter is driven, determine a number of converter channels to perform the PFC operation among the plurality of converter channels, (ii) determine target converter channels to perform the PFC operation among the plurality of converter channels, and (iii) determine a switching time, based on at least one converter channel being in operation,
    wherein the controller is further configured to (i) store a switching history of a converter channel that has previously performed the PFC operation, and (ii) based on the stored switching history, determine a switching driving sequence of the target converter channels to perform the PFC operation after excluding a switching time of the converter channel that has been operated immediately before from an initial driving sequence.

15. The air conditioner of claim 14, wherein the controller is configured, based on no converter channel being in operation when determining the number of converter channels, to determine a switching driving sequence of the target converter channels by using a predetermined function, wherein the predetermined function is a random function.

16. The air conditioner of claim 14, wherein the power factor improving unit comprises a first converter channel, a second converter channel, and a third converter channel, and
    wherein the current sensor is configured to sense the input current through a shunt resistor connected in series to each of the first to third converter channels.

* * * * *